United States Patent
Furman et al.

(12)

(10) Patent No.: US 6,781,446 B2
(45) Date of Patent: Aug. 24, 2004

(54) METHOD AND APPARATUS FOR THE DETECTION AND CLASSIFICATION OF SIGNALS UTILIZING KNOWN REPEATED TRAINING SEQUENCES

(75) Inventors: William Nelson Furman, Fairport, NY (US); John Wesley Nieto, Rochester, NY (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/981,788

(22) Filed: Oct. 19, 2001

(65) Prior Publication Data

US 2003/0076165 A1 Apr. 24, 2003

(51) Int. Cl.⁷ .................................................. H03D 3/00
(52) U.S. Cl. .................... 329/304; 375/340; 342/378
(58) Field of Search ................... 329/304; 342/357.02, 342/352, 378; 708/818; 324/76.35; 375/340

(56) References Cited

U.S. PATENT DOCUMENTS 5,903,654 A * 5/1999 Milton et al. .......... 342/357.02
6,529,566 B1 * 3/2003 Carsello et al. ............. 375/340

* cited by examiner

*Primary Examiner*—Arnold Kinkead
(74) *Attorney, Agent, or Firm*—Duane Morris LLP

(57) ABSTRACT

A system and method for detecting the presence of a transmitted waveform in a high noise environment. The system and method can detect and classify a modulated waveform without first demodulating the signal, and can detect and classify a waveform having a frequency offset without compensating for the frequency offset.

20 Claims, 1 Drawing Sheet

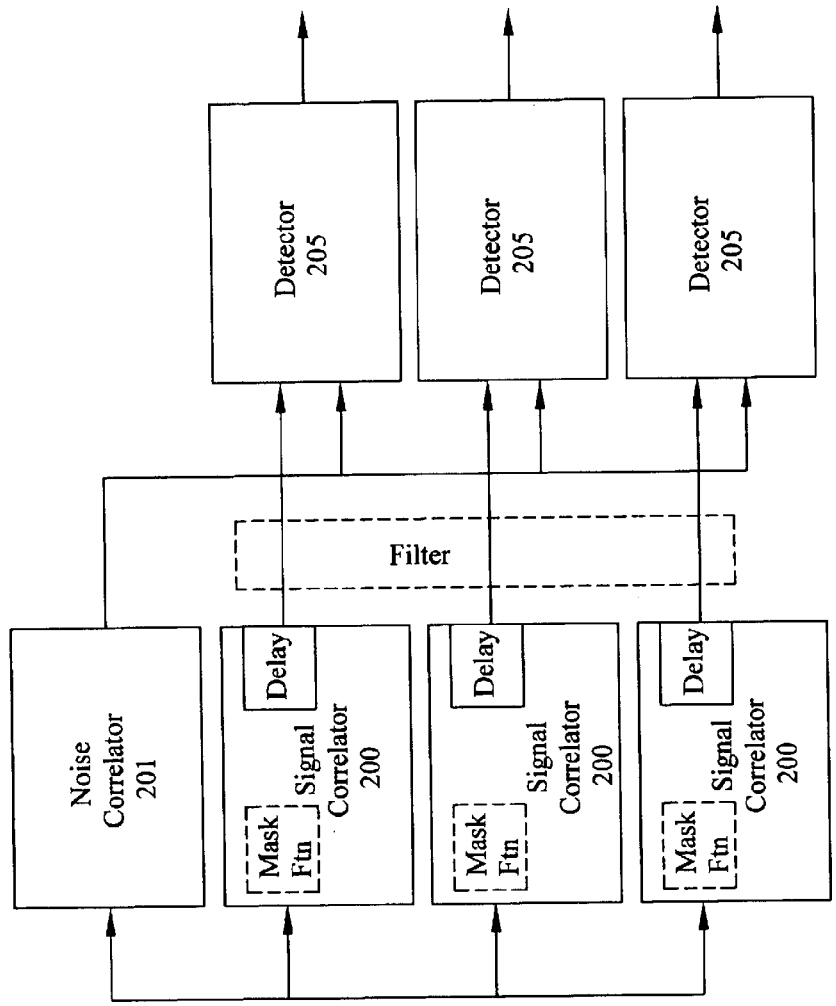

METHOD AND APPARATUS FOR THE DETECTION AND CLASSIFICATION OF SIGNALS UTILIZING KNOWN REPEATED TRAINING SEQUENCES

BACKGROUND OF THE INVENTION

The present system and method is generally applicable to communication systems for receiving signals in a high noise environment, and specifically of systems which monitor radio frequencies to determine the presence of a transmitted waveform. Detection of transmitted waveforms may be necessary in order to prevent transmission collisions or may be desired for monitoring or surveillance systems whose goal is to detect and exploit received signals. Although described with respect to the HF radio propagation band, the present system and method is equally applicable to all communication systems and radio frequency bands.

Collision avoidance is an important consideration in communication systems due to the limited bandwidth available. Collision avoidance systems allow an increase in the throughput of the communication system by reducing the number of collisions and thus reducing the need to retransmit signals that were not successfully received. Many communication systems or networks, both wired (e.g., Ethernet) and wireless (e.g., HF, VHF, UHF radio) utilize a form of Carrier Sense Multiple Access (CSMA) to determine whether a frequency or radio channel is being used by another station or stations prior to transmission. Systems utilizing CSMA typically detect the signal energy on the desired channel and classify the channel as in use if a predetermined threshold is exceeded. However, collision avoidance systems which rely on the detection of signal energy, generally require an environment having a positive signal-to-noise (SNR) and do not work well in the noise and interference rich environment of radio communications where negative SNRs are common.

Signal detection of standard HF waveforms is further hampered by the use of heavily filtered Phase Shift Keyed (PSK) and Quadrature-Amplitude Modulated (QAM) waveforms. These waveforms are extremely noise-like in nature and difficult to distinguish from background noise and interference.

Conventional prior art waveform detection systems can not detect or classify a modulated waveform without first demodulating the received signal. These systems are computationally intense because the standard demodulation of the modem signal from the sub-carrier requires the demodulators to perform many functions including (a) waveform acquisition, (b) adaptive equalization, (c) forward error correction (FEC), (d) decoding, and (e) phase, time, and frequency offset tracking.

Additionally, because the received signal needs to be demodulated, the beginning of the transmission has to be received and recognized by the detection system to ensure proper demodulation.

Many of the waveforms defined in U.S. Military and NATO (STANAG) HF Standards utilize interspersed blocks of known data, commonly referred to as training sequences, in their transmissions. These blocks of known data can aid demodulators in training adaptive equalizers to track variations of the radio propagation channel caused by fading and multi-path conditions.

In addition to prevent collisions between separate transmissions, the detection and classification of waveforms is also an important consideration for surveillance systems which are designed to locate and exploit transmitted waveforms.

The present system and method advantageously exploits the transmitted training sequence of a signal to detect the presence of a waveform without requiring the full demodulation process that would be necessary to regenerate the transmitted data. Further the present system and method can classify the type of waveform detected.

Accordingly, it is an object of the present invention to provide a novel method and system for detecting standard modem transmissions without requiring demodulation of the signals.

It is another object of the present invention to provide a novel system and method to detect the transmission of a waveform in the presence of a frequency offset without compensating for the frequency offset.

It is a yet another object of the present invention to provide a novel system and method to detect the presence of a transmitted waveform in a very high noise and interference environment.

It is still another object of the present invention to provide a novel system and method to detect the presence of a transmitted waveform utilizing a fairly short observation period (approximately 2400 transmitted symbols).

It is yet still another object of the present invention to provide a novel system and method to classify the type of received modulated waveform without requiring demodulation of the waveform.

It is a further object of the present invention to provide a novel system and method to perform the detection and classification of a transmitted waveform with a minimum of calculations.

These and many other objects and advantages of the present invention will be readily apparent to one skilled in the art to which it pertains from a perusal of the claims, the appended drawings, and the following detailed description of the preferred embodiments.

BRIEF DESCRIPTION OF THE DRAWINGS

FIG. 1 is a pictorial representation of a conventional HF waveform.

FIG. 2 is a block diagram of the present detection system utilized for detecting and classifying a waveform such as illustrated in FIG. 1.

DETAILED DESCRIPTION OF THE PREFERRED EMBODIMENT

FIG. 1 illustrates an example of a typical HF waveform. The waveform is comprised of blocks of known (Ki) or unknown (Ui) data, where i is the number of respective known and unknown blocks. Each block is N symbols long (where N can be any number greater than 0). For example, each block may be of length 16 or 20 8-PSK symbols, transmitted at a symbol rate of 2400 or 1200 symbols per second. The known waveform blocks have a length Nk and the unknown waveform blocks have a length Nu. Typically, the known waveform blocks repeat every R known blocks. In the example waveform of FIG. 1, the repetition rate R equals 4.

Waveforms types are defined by specific standards which dictate the length of the known data blocks, the length of the unknown data blocks, and the repetition rates of the known data blocks. The present system and method exploits these known parameters to detect the presence of a waveform as well as to classify the waveform.

Because of the repetition of the known data blocks, a signal which is delayed one repetition sequence and combined with the undelayed signal will produce a peak corresponding to the reinforcement of the known data blocks of the respective signals. Thus, for the waveform of FIG. 1, a correlation technique that delays the received waveform by Rx(Nk+Nu) symbols will generate a peak that can be used in a detection algorithm. A simple threshold test can be applied to the output of the correlator to determine if an expected waveform is present.

Note that if the specific type of transmitted waveform is not known, several correlators may be required, each one programmed to a different known delay according to the specific waveform standards. The correlator which produces the peak correlation value will thus indicate the presence of the waveform, and the delay required to produce the peak correlation value will identify the repetition rate of the waveform and therefore assist in classification of the waveform according to the known waveform standards.

Note that use of this detection method does not require the detection system to recognize the starting point of any block of known symbols and need not include the beginning of the transmission. At least one repetition of the known blocks is all that is required and thus detection of the waveform is common utilizing a fairly short observation period, e.g., approximately 2400 transmitted symbols.

With reference now to FIG. 2, an embodiment of the present waveform detection system and method is shown for detecting the presence of three types of waveforms. Three signal correlators 200 are used to detect the presence of three expected waveform types, with each correlator programmed for the length of the known data blocks, the length of the unknown data blocks, and the repetition rates of the known data blocks for a specific expected waveform. A received signal is sent to noise correlator 201 and the three signal processors 200. Note that the received signal may be modulated and is not required that the received signal be demodulated prior to being received at signal correlators 200 or noise correlator 201. For example the signal may be at a suitable IF frequency or before sub-carrier demodulation in a Single Side Band (SSB) system.

In operation, each signal correlator 200 is programmed for an anticipated search delay based on an expected waveform. For example, if the waveform of FIG. 1 is one of the expected waveforms, one of the signal detectors would be programmed to have a signal delay equal to the repetition rate of the waveform of FIG. 1. For a given waveform, if the length of known data is Nk and the length of the unknown data is Nu and the known blocks repeat every R blocks, the anticipated dely for the waveform would be:

$$Rx(Nk+Nu) \quad (1)$$

For the waveform of FIG. 1, the antcipated delay would be 4x(Nk+Nu) symbols. Each of the signal correlators 200 is programmed for a differenet search delay depending on the expected waveform. The signal correlators 200 delay the input signal by the specified search delay, multiply the delayed signal by the un-delayed input signal and integrate the output. Each signal correlator 200 uses a number of delays surrounding and including the specified search delay. One purpose of using a window of delays around the expected delay is to resolve and utilize the multipath components of the received signal. For example, if a correlation peak for a waveform was anticipated at a delay of 1000 symbols, the signal correlator would correlate for delays between 900 to 1100 symbols. Each signal correlator 200 determines the maximum correlation value over its range of search delays and provides the maximum correlation value and the delay value at which the peak occurred to its detector 205.

Detector 205 evaluates the received peak correlation value from the signal correlator 200 and determines if peak correlation value is within a small target window, e.g., 4–10 symbols, of its expected value for the expected waveform. Detector 205 receives a noise signal from the noise correlator 201 which is representative of the background noise and determines if the peak value is greater than the background noise value measured by the noise correlator 201. If the peak value is within the target window and greater than the background noise, presence of the expected waveform is declared. Note that both the presence of and the type of waveform is determined without the necessity of demodulating the input signal.

It is not uncommon for standard HF waveforms to have frequency offsets of 100 Hz or more. Conventional waveform detection systems would normally have to compensate for the frequency offset in order to properly demodulate the input signal to determine if the waveform is present. However, the present system and method is capable of detecting the presence of an HF waveform having a frequency offset of several hundred Hz because the detection of the waveform is based on the repetition of the known data blocks which are expected to have the same frequency offset and therefore the frequency offset need not be compensated for. Note that the the ability to detect a received signal having a frequency offset of several hundred Hz covers the entire range of expected frequency offsets for HF waveforms.

In another embodiment of the present system and method, waveforms having small known to unknown waveform ratios can be detected. Many waveforms have known to unknown ratios in the range of 1:2 or 1:3 and the length of the known block and the signal energy therein is sufficient to detect the waveform. However, for ratios smaller than 1:3, e.g. 1:4, the noise from the unknown waveform can obsure the known waveform and make detection of the known waveform difficult. Additionally, some waveforms use a modulation scheme which varies throughout the transmission of the waveform resulting in the known blocks having different modulation. Signal correlator 200 may be programmed to utilize a rotating mask function to detect the presence of the waveform having such small known to unknown ratios.

For example a mask function having a length (Nk+Nu) and containing Nk 1's followed by Nu 0's may be used to mask the energy from the known blocks and help identify the known blocks. The mask is rotated by one symbol and repeated over the duration of the input signal and the signal correlator 201 is run for all Nk+Nu alignments of the mask. The mask alignment that results in the maximum correlator output is selected. For example, for a waveform having a known block of thirty symbols and an unknown block of one hundred symbols, the mask would be comprised of thirty 1's and one hundred 0's. The mask would then rotate through for all possible delays as follows:

thirty 1's followed by one hundred 0's twenty nine 1's followed by one hundred 0's follwed by one 1 twenty eight 1's followed by one hundred 0's followed by two 1's twenty seven 1's followed by one hundred 0's followed by three 1's etc., etc.

Without the mask, the added noise introduced by the unknown waveform can obscure the effects of the known waveform and thus make detection of the waveform more difficult.

In another embodiment of the present sytem and method for detecting waveforms with smaller known/unknown ratios including low rate modulation, the signal correlator 200 is programmed to take the absolute value of each sub correlation of Nk symbols. This eliminates the effect of low-rate modulation of the known waveform, which in the worst case scenario can cause all the component correlations to cancel each other out.

Some HF waveforms employ a known sequence which is generated by the repetition of a smaller maximal length sequence (MLS). The output from the signal correlator 200 for this type of waveform has three peaks, with the first and third being less than the center peak. In another embodiment of applicant's disclosure, a three-tap combining filter combines the energy from these three peaks to enhance the detection capability of the detectors. The filter may be an N-tap combining filter (where N is greater than or equal to 1). The value of N should be selected to match the particular properties of the autocorrelation function of the expected waveform.

Thus, the present system and method can detect a modulated waveform in a high noise environment without regard to the frequency offset of the received signal and without first demodulating the signal.

While preferred embodiments of the present system and method have been described, it is to be understood that the embodiments described are illustrative only and the scope of the invention is to be defined solely by the appended claims when accorded a full range of equivalence, many variations and modifications naturally occurring to those skilled in the art from a perusal thereof.

What is claimed is:

1. A method of detecting the presence of a transmitted waveform, comprising the steps of:
   (a) receiving a first signal comprising a waveform where the waveform has a portion thereof which repeats at a predetermined interval;
   (b) delaying the first signal an integer number of the predetermined intervals to provide a second signal;
   (c) combining the first and second signals to produce a correlation signal;
   (d) evaluating the correlation signal against a predetermined criteria; and
   (e) detecting the waveform as a function of the evaluation of the correlation signal.

2. The method of claim 1 wherein steps (b) and (c) are repeated for a plurality of intervals to produce a plurality of correlation signals; and
   wherein the step of evaluating comprises determining the maximum correlation signal from the plurality of correlation signals.

3. The method of claim 1 wherein the transmitted waveform comprises a plurality of blocks of known data each having a first length (Nk) and a plurality of blocks of unknown data each having a second length (Nu);
   wherein the blocks of known data are repeated every R known blocks; and
   wherein the predetermined interval by which the first signal is delayed is approximately equal to R(Nk+Nu).

4. The method of claim 1 wherein the transmitted waveform is a modulated waveform and wherein the modulated waveform is detected without demodulating the waveform.

5. The method of claim 1 wherein the transmitted waveform contains a frequency offset and wherein the transmitted waveform is detected without compensating for the frequency offset.

6. The method of claim 1 further comprising the step of classifying the type of waveform detected as a function of an interval delay.

7. The method of claim 1 wherein the step of evaluating includes the step of filtering the correlation signal with an N-tap combining filter where N is a function of the waveform being detected.

8. The method of claim 1 wherein the transmitted waveform comprises a plurality of blocks of known data each having a first length (Nk) and a plurality of blocks of unknown data each having a second length (Nu);
   wherein the blocks of known data are repeated every R known blocks; and
   wherein the step of evaluating includes masking of the correlation signal to mask signal energy introduced by the unknown data.

9. The method of claim 8 wherein the step of masking includes the use of a rotating mask having a Nk length of first weighting values and a Nu length of second weighting values; and
   wherein the first weighting values and the second weighting values are chosen to mask the signal energy associated with the unknown data.

10. A method of detecting the presence of a first signal having a portion which repeats at a predetermined interval, comprising the steps of:
    (a) delaying the first signal by an integer number of the predetermined intervals to provide a second signal;
    (b) combining the first and second signals to produce a correlation signal; and
    (c) evaluating the correlation signal against predetermined criteria to thereby determine the presence of the first signal.

11. The method of claim 10 wherein the predetermined criteria includes determining if the correlation signal exceeds a predetermined threshold.

12. The method of claim 10 wherein the predetermined criteria includes determining if the correlation signal is within a predetermined range of values.

13. The method of claim 10 where steps (a) and (b) are repeated for a plurality of intervals to produce a plurality of correlation signals;
    and wherein the step of evaluating comprises determining the maximum correlation signal among the plurality of correlation signals.

14. The method of claim 10 wherein the first signal comprises a plurality of blocks of known data each having a first length (Nk) and a plurality of blocks of unknown data each having a second length (Nu);
    wherein the plurality of blocks of known data are repeated every R known blocks; and
    wherein the first signal is delayed by approximately R(Nk+Nu).

15. The method of claim 10 wherein the first signal is a modulated signal; and wherein the first signal is detected without demodulating the first signal.

16. The method of claim 10 wherein the first signal contains a frequency offset; and
    wherein the first signal is detected without compensating for the frequency offset.

17. The method of claim 10 further comprising the step of classifying the type of signal detected as a function of the delay.

18. An apparatus for detecting the presence of a transmitted waveform having a portion which repeats at a predetermined interval, comprising:
    means for receiving a first signal containing the transmitted waveform;

means for delaying the first signal by an integer number of the predetermined intervals to provide a second signal;

means for combining the first and second signals to produce a correlation signal; and means for evaluating the correlation signal against a predetermined criteria to thereby determine the presence of the transmitted waveform.

19. The apparatus of claim 18 wherein the means for evaluating comprises an N-tap combining filter where N is a function of the waveform being detected.

20. The apparatus of claim 18 further comprising means for classifying the type of signal detected as a function of the interval delay.

* * * * *